US011490255B2

(12) United States Patent
Sharma et al.

(10) Patent No.: US 11,490,255 B2
(45) Date of Patent: Nov. 1, 2022

(54) RCS AUTHENTICATION

(71) Applicant: MAVENIR NETWORKS, INC., Richardson, TX (US)

(72) Inventors: Anish Sharma, McKinney, TX (US); Bejoy Pankajakshan, Allen, TX (US)

(73) Assignee: Mavenir Networks, Inc., Richardson, TX (US)

( * ) Notice: Subject to any disclaimer, the term of this patent is extended or adjusted under 35 U.S.C. 154(b) by 137 days.

(21) Appl. No.: 17/064,234

(22) Filed: Oct. 6, 2020

(65) Prior Publication Data

US 2021/0022000 A1 Jan. 21, 2021

Related U.S. Application Data

(63) Continuation of application No. PCT/US2019/027478, filed on Apr. 15, 2019.
(Continued)

(51) Int. Cl.
*G06F 7/04* (2006.01)
*G06F 15/16* (2006.01)
(Continued)

(52) U.S. Cl.
CPC .......... *H04W 12/068* (2021.01); *H04L 69/24* (2013.01); *H04W 8/04* (2013.01); *H04W 12/04* (2013.01); *H04W 12/08* (2013.01); *H04W 80/10* (2013.01)

(58) Field of Classification Search
CPC combination set(s) only.
See application file for complete search history.

(56) References Cited

U.S. PATENT DOCUMENTS 10,264,413 B1 * 4/2019 Bogineni ................ H04W 4/12
2007/0086582 A1    4/2007 Tai et al.
(Continued)

FOREIGN PATENT DOCUMENTS

CN    105490986 A    4/2016
WO    2017116896 A1   7/2017

OTHER PUBLICATIONS

International Search Report for corresponding International (PCT) application No. PCT/US19/27478, two pages, dated Jun. 28, 2019.
(Continued)

*Primary Examiner* — Phy Anh T Vu
(74) *Attorney, Agent, or Firm* — Ruggiero, McAllister & McMahon LLC

(57) ABSTRACT

In a system and a method for providing authentication for Rich Communication Services (RCS) application on a user equipment (UE), a Proxy Call Session Control Function (P-CSCF) of the IMS receives a SIP REGISTER request message sent from an IMS Session Initiation Protocol (SIP) client on the UE as part of an authentication of the IMS SIP client. A Serving Call Session Control Function (S-CSCF) of the IMS or a registration service performs an Authentication and Key Agreement (AKA) challenge with the IMS SIP client as part of the authentication. A Home Subscriber Server (HSS) of the IMS or a Unified Data Management (UDM) function provides, upon successful authentication of the IMS SIP client, an initial authorization grant for the IMS SIP client. The RCS application, after obtaining the initial authorization grant, registers for RCS service with the RCS network, via RCS Application Programming Interface Gateway (API GW).

12 Claims, 5 Drawing Sheets

Related U.S. Application Data

(60) Provisional application No. 62/659,545, filed on Apr. 18, 2018.

(51) Int. Cl.
| | | |
|---|---|---|
| *H04L 29/06* | (2006.01) | |
| *H04W 12/06* | (2021.01) | |
| *H04L 69/24* | (2022.01) | |
| *H04W 8/04* | (2009.01) | |
| *H04W 12/04* | (2021.01) | |
| *H04W 12/08* | (2021.01) | |
| *H04W 80/10* | (2009.01) | |

(56) References Cited

U.S. PATENT DOCUMENTS

| | | | | |
|---|---|---|---|---|
| 2008/0126230 | A1* | 5/2008 | Bellora | G06Q 20/28 705/30 |
| 2009/0067417 | A1 | 3/2009 | Kalavade et al. | |
| 2012/0322468 | A1 | 12/2012 | Cai et al. | |
| 2014/0086177 | A1 | 3/2014 | Adjakple et al. | |
| 2014/0372557 | A1* | 12/2014 | Buckley | H04L 67/104 709/217 |
| 2014/0379931 | A1 | 12/2014 | Gaviria | |
| 2017/0063977 | A1* | 3/2017 | Jalwadi | H04L 41/0213 |
| 2017/0171120 | A1* | 6/2017 | Chiang | H04L 67/24 |
| 2019/0044980 | A1* | 2/2019 | Russell | H04W 8/06 |
| 2020/0322394 | A1* | 10/2020 | Marappa Gounder | H04L 65/1063 |
| 2021/0084160 | A1* | 3/2021 | Reddy | H04L 67/55 |

OTHER PUBLICATIONS

International Written Opinion for corresponding International (PCT) application No. PCT/US19/27478, six pages, dated Jun. 28, 2019.
Extended European Search Report for corresponding European application No. EP 19 78 7818, seven pages, dated Nov. 10, 2021.
Extended European Search Report for related European application No. EP 19 78 8032.1, 13 pages, dated Jan. 5, 2022.
Paganelli et al "Formalizing REST APIs for web-based communication and SIP interworking" Telecommunication Systems, Baltzer Science Publishers, Basel, CH, vol. 66, No. 1, Jan. 27, 2017(Jan. 27, 2017), pp. 75-93, XP036283814, ISSN: 1018-4864.
Davids et al. "SIP APIs for Voice and Video Communications on the Web .", Proceeding of the ACM IPT comm 2011, Aug. 2, 2011(Aug. 2, 2011), XP055077404, Retrieved from the Internet [retrieved on Sep. 3, 2013].
Huawei et al."Solution for KI on Discovery of Network Functions",3GPP Draft; S2-183365_Solution for KI on Discovery of Network Functions, 3rd Generation Partnership Project (3GPP), Mobile Competence Centre ; 650, Route Des Lucioles ; F-06921 Sophia-Antipolis Cedex vol. SA WG2, No. Sanya, China; Apr. 16, 2018-Apr. 20, 2018 Apr. 10, 2018.

* cited by examiner

RCS AUTHENTICATION

CROSS REFERENCE TO RELATED APPLICATIONS

The present application is a continuation application of International (PCT) application No. PCT/US2019/027478 filed on Apr. 15, 2019 which claims priority to U.S. Provisional Patent Application No. 62/659,545, filed on Apr. 18, 2018 both of which are incorporated herein by reference in their entireties.

BACKGROUND OF THE DISCLOSURE

Field of the Disclosure

The present disclosure relates to a system and a method for providing Rich Communication Services (RCS) authentication.

Description of the Related Art

Rich Communication Services (RCS) Universal Profile represents a set of globally shared RCS specifications established by Global System for Mobile Communications Association (GSMA), the standard-setting organization for establishing RCS service requirements. Starting with basic rich messaging features targeted at native device integration, RCS now includes downloadable applications and business messaging, which are now addressed as part of Universal Profiles (UP) in GSMA standards. The Universal Profile describes a single, global RCS implementation to be deployed worldwide, and the aim of the Universal Profile is to reduce the variation that exists today across various RCS profiles in order to simplify large-scale deployment. The UP targets Operating System (OS) developers and Original Equipment Manufacturers (OEM) for open market device implementations, and the focus of the UP requirements is on native device implementations at the OS or device manufacturer level.

The Universal Profile specifications acknowledge that providing all services on downloadable apps will be challenging given that the device manufacturers have limited the interactions with over-the-top (OTT) apps for RCS services. UP specification 2.0 (RCS Universal Profile Service Definition Document v2.0, or "RCC.71_v2.0") has laid out different authentication mechanisms available for user authentication (e.g., section 16.3.2 of RCC7.1_v2.0). In the case a service provider opts for hosted RCS service model, RCS service is provided through a separate network than voice-over-Long-Term-Evolution (VoLTE). User downloads an RCS application on a user device, which can be a native device, and for authentication, some sort of user interaction is needed to authenticate with the network, which authentication can be a one-time-password (OTP)-based authentication or username/password authentication as specified in the UP specifications. However, both of these authentications are cumbersome for the user.

Therefore, there is a need for an authentication solution that avoids user interaction when the application is running on a native device, e.g., a phone.

BRIEF SUMMARY OF THE DISCLOSURE

In one example embodiment, a system and a method are provided for RCS authentication that avoids user interaction when the application is running on a native device, e.g., a phone. In accordance with the present disclosure, RCS service is provided by a separate network which is suitable for hosted model but still using the same phone number for RCS service. The separate RCS network can be owned by a network operator or can be provided by a hosted RCS service provider.

In one example embodiment, a system and a method are provided for RCS authentication, which system and method utilize open authorization (OAuth).

In one example embodiment, a system and a method are provided for RCS authentication, in which system and method: i) an existing IMS network issues authorization grant for use of RCS service for every successful registration from a primary device, e.g., a phone; ii) the network-issued grants are available to the RCS applications through native device integration, whereby the network-issued grants are only exchanged with certain trusted application(s) on the device; and iii) RCS application then exchanges these grants with an RCS network in order to obtain the service.

In one example embodiment, a system and a method are provided for RCS authentication, in which system and method: i) an existing IMS network issues OAuth authorization grant for use of RCS service for every successful registration from a primary device, e.g., a phone, which OAuth authorization grants can include "Authorization code" and "Implicit" of RFC 6749; ii) the network-issued grants are available to the RCS applications through native device integration, whereby the network-issued grants are only exchanged with certain trusted application(s) on the device; and iii) RCS application then exchanges these grants with an RCS network in order to obtain the service.

In one example embodiment, a system and a method are provided for RCS authentication, in which system and method: i) an existing IMS network acts as an authorization server and issues OAuth authorization grant for use of RCS service for every successful registration from a primary device, e.g., a phone, which OAuth authorization grants can include "Authorization code" and "Implicit" of RFC 6749; ii) the network-issued grants are available to the RCS applications through native device integration, whereby the network-issued grants are only exchanged with certain trusted application(s) on the device; and iii) RCS application then exchanges these grants with an RCS network in order to obtain the service.

In one example embodiment, a method is provided for authentication of Rich Communication Services (RCS) application on a user equipment (UE) for RCS service provided by an RCS network, wherein the RCS network is separate from an IP Multimedia Subsystem (IMS), and wherein IMS Session Initiation Protocol (SIP) client is provided on the UE, in which method: an authentication of the IMS SIP client is performed, which authentication comprises i) sending, by the IMS SIP client, a SIP REGISTER request message to a Proxy Call Session Control Function (P-CSCF) of the IMS, and ii) performing, by one of a Serving Call Session Control Function (S-CSCF) of the IMS or a registration service, an Authentication and Key Agreement (AKA) challenge with the IMS SIP client; an initial authorization grant for the IMS SIP client is provided by one of a Home Subscriber Server (HSS) of the IMS or a Unified Data Management (UDM) function module upon successful authentication of the IMS SIP client; the initial authorization grant is obtained by the RCS application; and the RCS application registers for RCS service with the RCS network via RCS Application Programming Interface Gateway (API GW). In the event of native IMS client failure (such as when no authorization grant can be provided by IMS client, e.g., it may not be registered with IMS or IMS registration fails for any reason), the RCS application reverts to using one of the authentication mechanisms specified in the GSMA specifications, which can require user intervention.

In another example embodiment, the initial authorization grant comprises one of an access token or an authorization code.

In another example embodiment, the initial authorization grant is provided by one of the HSS or the UDM function module to one of the S-CSCF or the registration service, and wherein one of the S-CSCF or the registration service provides the initial authorization grant to the IMS SIP client.

In another example embodiment, the initial authorization grant is provided by one of the HSS or the UDM function module to the P-CSCF, and wherein the P-SCSCF provides the initial authorization grant to the IMS SIP client.

In another example embodiment, i) upon receipt of the initial authorization grant by the IMS SIP client, the initial authorization grant is transmitted by the IMS SIP client to the RCS application, or ii) the initial authorization grant is transmitted by the IMS SIP client to the RCS application in response to a query from the RCS application.

In another example embodiment, the registering via the RCS API GW comprises sending, by the RCS application, a message containing the initial authorization grant to the RCS API GW.

In another example embodiment, the initial authorization grant is an authorization code, and wherein the registering via the RCS API GW comprises: sending, by the RCS application, a message containing the initial authorization grant to the RCS API GW; and obtaining, by the RCS API GW, an access token from one of the HSS or the UDM function module.

In one example embodiment, a system is provided for authentication of Rich Communication Services (RCS) application on a user equipment (UE) for RCS service provided by an RCS network, wherein the RCS network is separate from an IP Multimedia Subsystem (IMS), and wherein IMS Session Initiation Protocol (SIP) client is provided on the UE, the system comprising: a Proxy Call Session Control Function (P-CSCF) of the IMS configured to receive a SIP REGISTER request message sent from an IMS SIP client as part of an authentication of the IMS SIP client; one of a Serving Call Session Control Function (S-CSCF) of the IMS or a registration service configured to perform an Authentication and Key Agreement (AKA) challenge with the IMS SIP client as part of the authentication of the IMS SIP client; and one of a Home Subscriber Server (HSS) of the IMS or a Unified Data Management (UDM) function module configured to provide an initial authorization grant for the IMS SIP client, upon successful authentication of the IMS SIP client; wherein the RCS application, after obtaining the initial authorization grant, registers for RCS service with the RCS network, via RCS Application Programming Interface Gateway (API GW) of the RCS network. In the event of native IMS client failure (such as when no authorization grant can be provided by IMS client, e.g., it may not be registered with IMS or IMS registration fails for any reason), the RCS application reverts to using one of the authentication mechanisms specified in the GSMA specifications, which can require user intervention.

DETAILED DESCRIPTION OF DISCLOSURE

The various embodiments of the system and the method according to the present disclosure are described in detail in connection with the message flow diagrams shown in FIGS. 1-4 and the flowchart shown in FIG. 5. The message flow diagrams shown in FIGS. 1-4 present a message flow that can be implemented using a Session Initiation Protocol (SIP)-based IP Multimedia Subsystem (IMS) core with Interrogating Call Session Control Function (I-CSCF)/Serving Call Session Control Function (S-CSCF) and Home Subscriber Server (HSS), or alternatively, using a service-based architecture (instead of the SIP-based IMS core) having Registration Service (instead of I-CSCF/S-CSCF, hereinafter also referred to as I/S-CSCF) and Uniform Data Management (UDM) function. In addition, the message flow diagrams in FIGS. 1-4 show a Representational State Transfer (REST)-based RCS network (e.g., client-to-RCS Application Programming Interface Gateway (API GW) interface is shown as REST), but the network can be SIP-based RCS network. It should be noted that, in the present disclosure, REST is only applicable when the IMS core is implemented using Service-Based Architecture (SBA), e.g., in 5G networks, otherwise SIP is applicable. The various components shown in FIGS. 1-4 (e.g., RCS network components and IMS components) can be implemented in software, hardware and/or a combination of the two.

Figure 1:
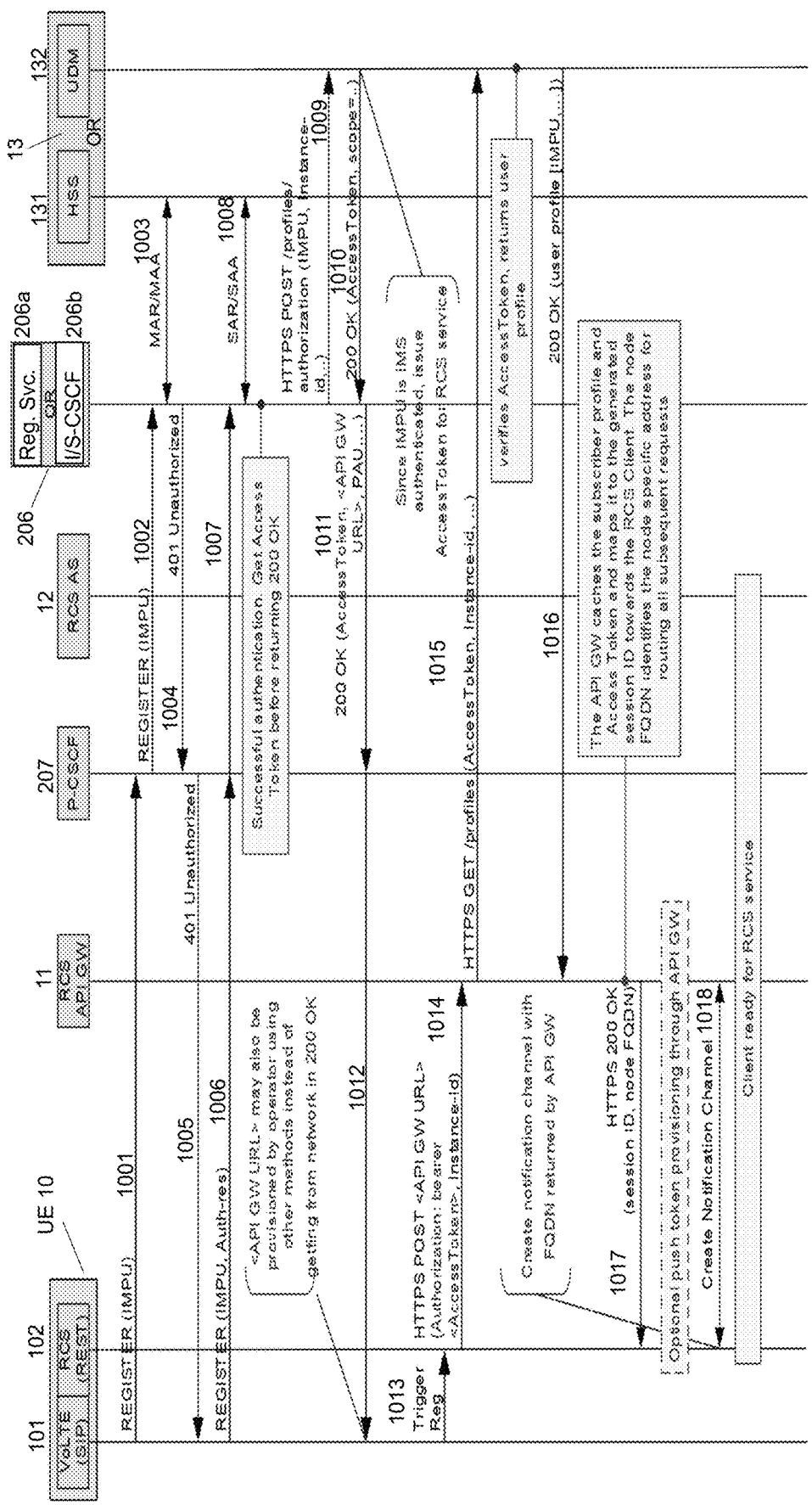
FIG. 1 illustrates an example embodiment of the message flow of a registration sequence for an IMS SIP client.

FIG. 1 illustrates an example embodiment of the message flow of a registration sequence for an IMS SIP client in an example system architecture according to the present disclosure. At 1001, the IMS SIP client 101 (on UE 10) attempts to register by sending a SIP REGISTER request message to the P-CSCF 207. At 1002, the P-CSCF 207 forwards the SIP REGISTER request to I-CSCF of I/S-CSCF 206b or Registration service 206a at block 206. At 1003, the IMS authentication procedure begins, i.e., by the S-CSCF of I/S-CSCF 206b or the Registration service 206a i) sending a Multimedia Authorization Request (MAR) to block 13, and ii) receiving a Multimedia Authorization Answer (MAA) from the block 13. In FIG. 1 (as well as in FIGS. 2-4), block 13 is shown as a combined block that includes Home Subscriber Server (HSS) 131 for the case of message flow using SIP IMS core, or alternatively, Unified Data Management (UDM) function module 132 for the case of message flow using service-based architecture, and hence block 13 is hereinafter referred to as HSS/UDM 13, and signaling arrows shown as originating/terminating at HSS 131 for the case of message flow using SIP IMS core should be interpreted as signaling arrows originating/terminating at UDM function module 132 for the case of message flow using service-based architecture, and vice-versa. At 1004, the S-CSCF of I/S-CSCF 206b or the Registration service 206a sends a "401 Unauthorized" message to the P-CSCF 207, which message is forwarded (at 1005) by the P-CSCF 207 to the SIP client 101. At 1006, the IMS SIP client 101 responds by sending a second SIP REGISTER request to the P-CSCF 207, which second SIP REGISTER request includes the Authorization header containing an authentication challenge response. At 1007, the P-CSCF 207 transforms the SIP REGISTER request to a Register Request REST API and routes the request to the Registration service 206a (in the case the IMS core is implemented using Service-Based Architecture), otherwise the SIP REGISTER request is routed to the I/S-CSCF 206b. At 1008, the I/S-CSCF 206b or the Registration service 206a i) sends a Server Assignment Request (SAR) to HSS/UDM 13, and ii) receives a Server Assignment Answer (SAA) from the HSS/UDM 13. At this point, successful authentication (which will be treated as successful registration for the purpose of this document) has been achieved in this example embodiment for the next step of obtaining an access token. The sequence shown at 1003 to 1008 represents an example embodiment of Authentication and Key Agreement (AKA) challenge procedure.

Upon successful authentication (registration), the S-CSCF of the I/S-CSCF 206b or the Registration service 206a sends (at 1009) a request (labelled "HTTPS POST" in FIG. 1) to the HSS/UDM 13, to issue an access token. At 1010, the HSS/UDM 13 issues an access token (which is an example of a network-issued authorization grant), along with the scope of the service (e.g., RCS), in a "200 OK" message to the I/S-CSCF 206b or the Registration service 206a, which in turn relays (at 1011) the "200 OK" message to the P-CSCF 207, which in turn relays (at 1012) the "200 OK" message to the IMS SIP client 101. At 1013, the IMS SIP client 101 triggers a registration notification (hence making available the access token) to a trusted RCS application, e.g., RCS application 102. At 1014, the RCS application 102 registers with RCS network's RCS API Gateway (RCS API GW) 11 (which is equivalent to P-CSCF in IMS network), by sending "HTTPS POST" message containing the access token and the RCS API GW Uniform Resource Locator (URL), and no user interaction is required. In the case the RCS application 102 is downloaded after native IMS registration, the device integration can enable a trusted app (e.g., the RCS application 102) to query the access token. In addition, the RCS API GW URL to use can either be pre-configured by service provider or network operator in the RCS application, or supplied along with the access token to the native client (as shown at 1011 in FIG. 1), and the RCS API GW URL is then made available to the RCS application. The specific embodiments provided herein are merely exemplary, and the present disclosure encompasses other means to provide RCS API GW URL.

At 1015, the RCS API GW 11 requests the user (subscriber) profile from HSS/UDM 13 using the access token, i.e., by sending "HTTPS GET" message containing the access token to the HSS/UDM 13. After verifying the access token, the HSS/UDM 13 sends (at 1016) a "200 OK" message containing the user (subscriber) profile. The RCS API GW 11 caches the user (subscriber) profile and the access token, generates a session ID, and maps the cached information to the generated session ID towards the RCS application (client). At 1017, the RCS API GW 11 then sends a "HTTPS 200 OK" message containing the session ID and node fully qualified domain name (FQDN), which session ID is used by RCS application 102 for all subsequent interactions. At 1018, a notification channel is created between the RCS application 102 and RCS API GW 11, after which the RCS service is provided for the RCS application 102 by RCS application server (AS) 12.

Figure 2:
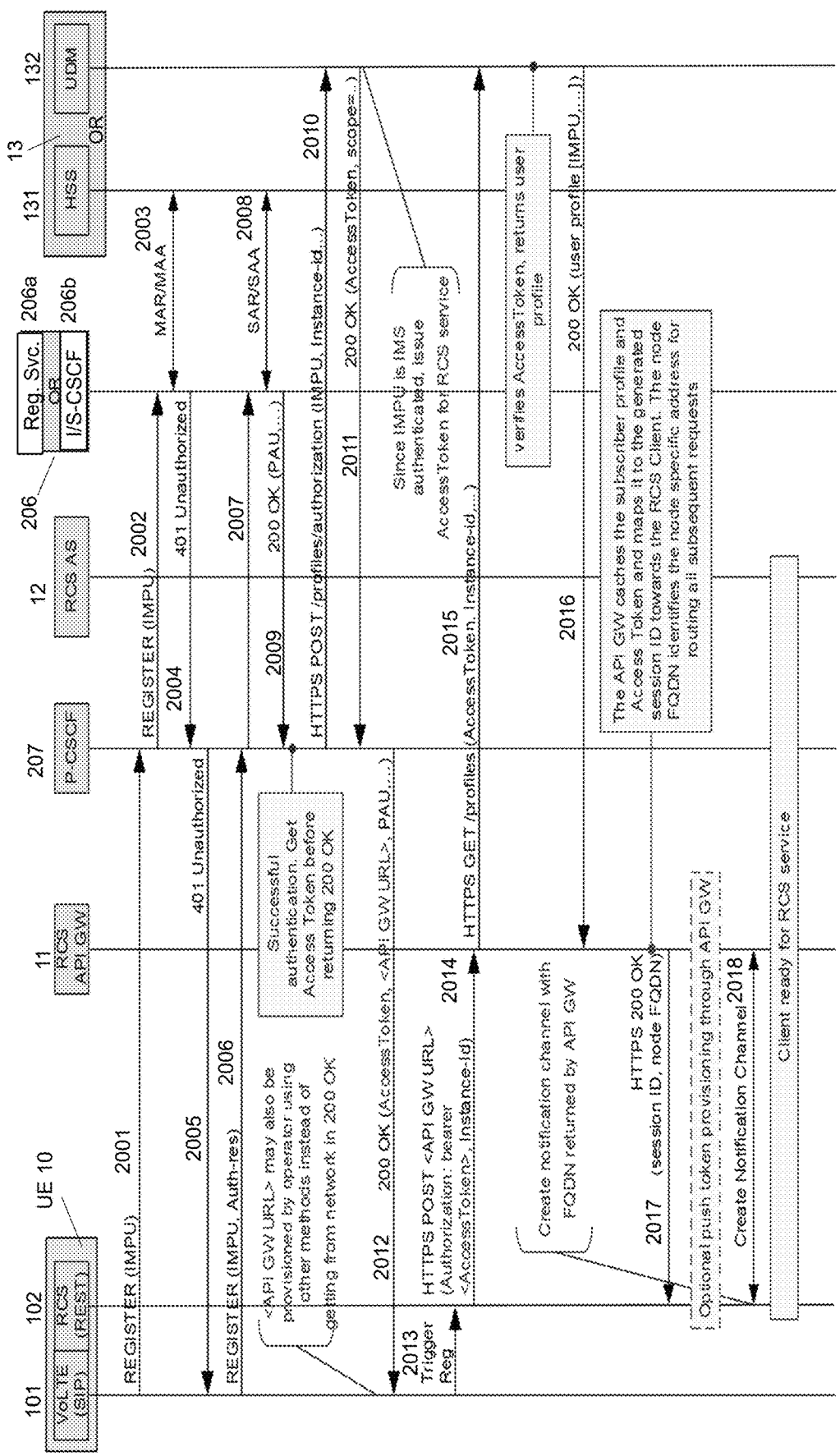
FIG. 2 illustrates another example embodiment of the message flow of a registration sequence for an IMS SIP client.

FIG. 2 illustrates another example embodiment of the message flow of a registration sequence for an IMS SIP client in an example system architecture according to the present disclosure. At 2001, the IMS SIP client 101 (on UE 10) attempts to register by sending a SIP REGISTER request message to the P-CSCF 207. At 2002, the P-CSCF 207 forwards the SIP REGISTER request to I-CSCF of I/S-CSCF 206b or Registration service 206a at block 206. At 2003, the IMS authentication procedure begins, i.e., by the S-CSCF of I/S-CSCF 206b or the Registration service 206a i) sending a Multimedia Authorization Request (MAR) to HSS/UDM 13 (which is shown as a combined block that includes Home Subscriber Server (HSS) 131 for the case of message flow using SIP IMS core, or alternatively, Unified Data Management (UDM) function module 132 for the case of message flow using service-based architecture), and ii) receiving a Multimedia Authorization Answer (MAA) from the HSS/UDM 13. At 2004, the S-CSCF of I/S-CSCF 206b or the Registration service 206a sends a "401 Unauthorized" message to the P-CSCF 207, which message is forwarded (at 2005) by the P-CSCF 207 to the SIP client 101. At 2006, the IMS SIP client 101 responds by sending a second SIP REGISTER request to the P-CSCF 207, which second SIP REGISTER request includes the Authorization header containing an authentication challenge response. At 2007, the P-CSCF 207 transforms the SIP REGISTER request to a Register Request REST API and routes the request to the Registration service 206a (in the case the IMS core is implemented using Service-Based Architecture), otherwise the SIP REGISTER request is routed to the I/S-CSCF 206b. At 2008, the I/S-CSCF 206b or the Registration service 206a i) sends a Server Assignment Request (SAR) to HSS/UDM 13, and ii) receives a Server Assignment Answer (SAA) from the HSS/UDM 13. At 2009, the I/S-CSCF 206b or the Registration service 206a sends a "200 OK" message to the P-CSCF 207, at which point successful authentication (which will be treated as successful registration for the purpose of this document) has been achieved in this example embodiment for the next step of obtaining an access token. The sequence shown at 2003 to 2008 represents an example embodiment of Authentication and Key Agreement (AKA) challenge procedure.

Upon successful authentication (registration), the P-CSCF 207 sends (at 2010) a request (labelled "HTTPS POST" in FIG. 2) to the HSS/UDM 13, to issue an access token. At 2011, the HSS/UDM 13 issues an access token (which is an example of a network-issued authorization grant), along with the scope of the service (e.g., RCS), in a "200 OK" message to the P-CSCF 207, which in turn relays (at 2012) the "200 OK" message to the IMS SIP client 101. At 2013, the IMS SIP client 101 triggers a registration notification (hence making available the access token) to a trusted RCS application, e.g., RCS application 102. At 2014, the RCS application 102 registers with RCS network's RCS API GW 11 by sending "HTTPS POST" message containing the access token and the RCS API GW Uniform Resource Locator (URL), and no user interaction is required. In the case the RCS application 102 is downloaded after native IMS registration, the device integration can enable a trusted app (e.g., the RCS application 102) to query the access token. In addition, the RCS API GW URL to use can either be pre-configured by operation in the RCS application, or supplied along with the access token to the native client (as shown at 2011 in FIG. 2), and the RCS API GW URL is then made available to the RCS application. The specific embodiments provided herein are merely exemplary, and the present disclosure encompasses other means to provide RCS API GW URL.

At 2015, the RCS API GW 11 requests the user (subscriber) profile from HSS/UDM 13 using the access token, i.e., by sending "HTTPS GET" message containing the access token to the HSS/UDM 13. After verifying the access token, the HSS/UDM 13 sends (at 2016) a "200 OK" message containing the user (subscriber) profile. The RCS API GW 11 caches the user (subscriber) profile and the access token, generates a session ID, and maps the cached information to the generated session ID towards the RCS application (client). At 2017, the RCS API GW 11 then sends a "HTTPS 200 OK" message containing the session ID and node fully qualified domain name (FQDN), which session ID is used by RCS application 102 for all subsequent interactions. At 2018, a notification channel is created between the RCS application 102 and RCS API GW 11, after which the RCS service is provided for the RCS application 102 by RCS application server (AS) 12.

Figure 3:
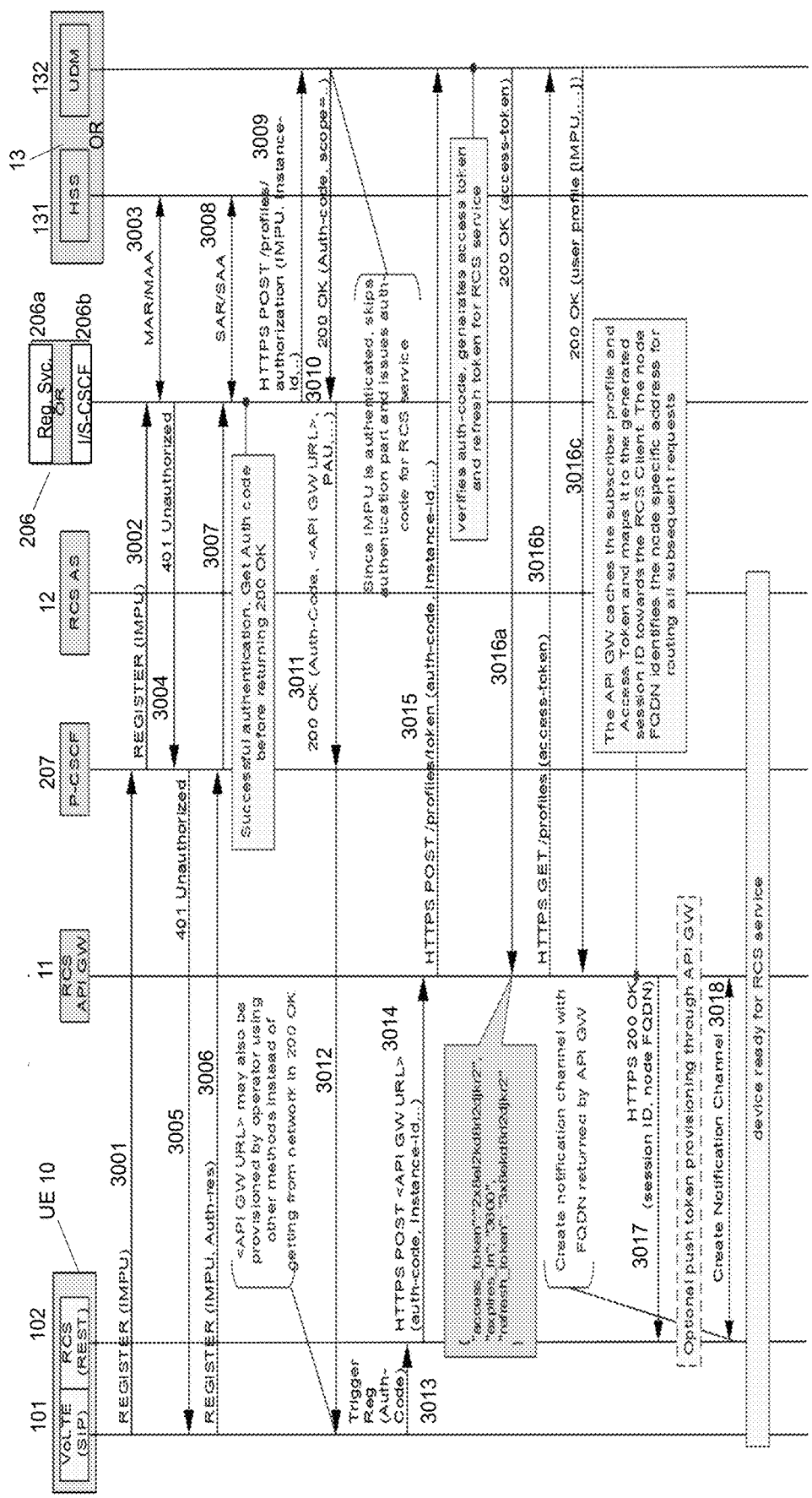
FIG. 3 illustrates another example embodiment of the message flow of a registration sequence for an IMS SIP client.

FIG. 3 illustrates another example embodiment of the message flow of a registration sequence for an IMS SIP client in an example system architecture according to the present disclosure. At 3001, the IMS SIP client 101 (on UE 10) attempts to register by sending a SIP REGISTER request message to the P-CSCF 207. At 3002, the P-CSCF 207 forwards the SIP REGISTER request to I-CSCF of I/S-CSCF 206b or Registration service 206a at block 206. At 3003, the IMS authentication procedure begins, i.e., by the S-CSCF of I/S-CSCF 206b or the Registration service 206a i) sending a Multimedia Authorization Request (MAR) to HSS/UDM 13 (which is shown as a combined block that includes Home Subscriber Server (HSS) 131 for the case of message flow using SIP IMS core, or alternatively, Unified Data Management (UDM) function module 132 for the case of message flow using service-based architecture), and ii) receiving a Multimedia Authorization Answer (MAA) from the HSS/UDM 13. At 3004, the S-CSCF of I/S-CSCF 206b or the Registration service 206a sends a "401 Unauthorized" message to the P-CSCF 207, which message is forwarded (at 3005) by the P-CSCF 207 to the SIP client 101. At 3006, the IMS SIP client 101 responds by sending a second SIP REGISTER request to the P-CSCF 207, which second SIP REGISTER request includes the Authorization header containing an authentication challenge response. At 3007, the P-CSCF 207 transforms the SIP REGISTER request to a Register Request REST API and routes the request to the Registration service 206a (in the case the IMS core is implemented using Service-Based Architecture), otherwise the SIP REGISTER request is routed to the I/S-CSCF 206b. At 3008, the I/S-CSCF 206b or the Registration service 206a i) sends a Server Assignment Request (SAR) to HSS/UDM 13, and ii) receives a Server Assignment Answer (SAA) from the HSS/UDM 13. At this point, successful authentication (which will be treated as successful registration for the purpose of this document) has been achieved in this example embodiment for the next step of obtaining an authorization code. The sequence shown at 3003 to 3008 represents an example embodiment of Authentication and Key Agreement (AKA) challenge procedure.

Upon successful authentication (registration), the S-CSCF of the I/S-CSCF 206b or the Registration service 206a sends (at 3009) a request (labelled "HTTPS POST" in FIG. 3) to the HSS/UDM 13, to issue an authorization code. At 3010, the HSS/UDM 13 issues an authorization code (which is an example of a network-issued authorization grant), along with the scope of the service (e.g., RCS), in a "200 OK" message to the I/S-CSCF 206b or the Registration service 206a, which in turn relays (at 3011) the "200 OK" message to the P-CSCF 207, which in turn relays (at 3012) the "200 OK" message to the IMS SIP client 101. At 3013, the IMS SIP client 101 triggers a registration notification (hence making available the authorization code) to a trusted RCS application, e.g., RCS application 102. At 3014, the RCS application 102 registers with RCS network's RCS API GW 11, by sending "HTTPS POST" message containing the authorization code and the RCS API GW Uniform Resource Locator (URL), and no user interaction is required. In the case the RCS application 102 is downloaded after native IMS registration, the device integration can enable a trusted app (e.g., the RCS application 102) to obtain the authorization code from the native client, in which case the native client explicitly requests the authorization code from the IMS network, e.g., by sending a refresh REGISTER request. In addition, the RCS API GW URL to use can either be pre-configured by operation in the RCS application, or supplied along with the authorization code to the native client (as shown at 3011 in FIG. 3), and the RCS API GW URL is then made available to the RCS application. The specific embodiments provided herein are merely exemplary, and the present disclosure encompasses other means to provide RCS API GW URL.

At 3015, the RCS API GW 11 sends "HTTPS POST" message containing the authorization code to the HSS/UDM 13. The HSS/UDM 13 verifies the authorization code, generates an access token, and sends (at 3016a) a "200 OK" message containing the access token to the RCS API GW 11. At 3016b, the RCS API GW 11 requests the user (subscriber) profile from HSS/UDM 13 using the access token, i.e., by sending "HTTPS GET" message containing the access token to the HSS/UDM 13. The HSS/UDM 13 sends (at 3016c) a "200 OK" message containing the user (subscriber) profile. The RCS API GW 11 caches the user (subscriber) profile and the access token, generates a session ID, and maps the cached information to the generated session ID towards the RCS application (client). At 3017, the RCS API GW 11 then sends a "HTTPS 200 OK" message containing the session ID and node fully qualified domain name (FQDN), which session ID is used by RCS application 102 for all subsequent interactions. At 3018, a notification channel is created between the RCS application 102 and RCS API GW 11, after which the RCS service is provided for the RCS application 102 by RCS application server (AS) 12.

Figure 4:
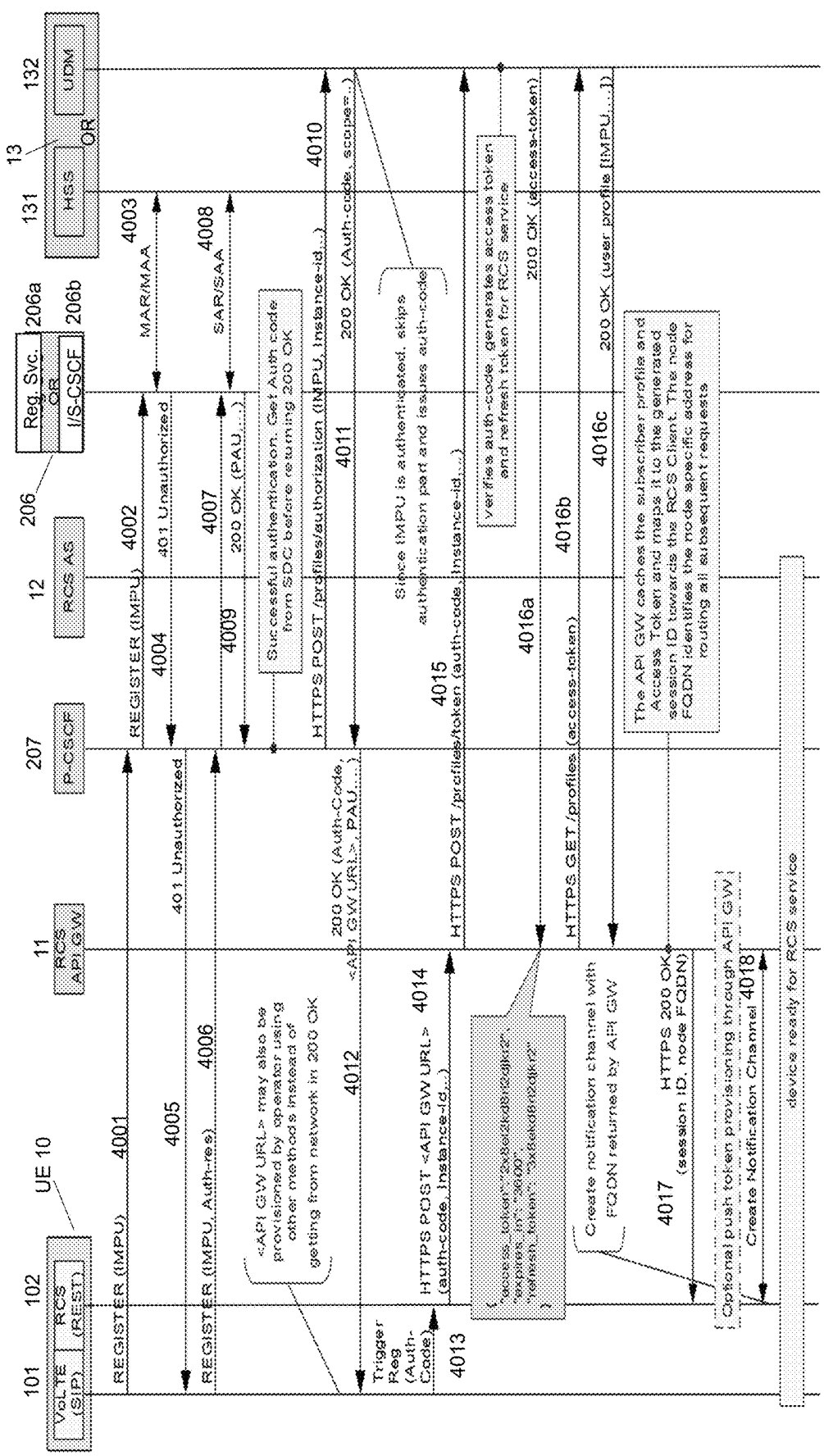
FIG. 4 illustrates another example embodiment of the message flow of a registration sequence for an IMS SIP client.

FIG. 4 illustrates another example embodiment of the message flow of a registration sequence for an IMS SIP client in an example system architecture according to the present disclosure. At 4001, the IMS SIP client 101 (on UE 10) attempts to register by sending a SIP REGISTER request message to the P-CSCF 207. At 4002, the P-CSCF 207 forwards the SIP REGISTER request to I-CSCF of I/S-CSCF 206b or Registration service 206a at block 206. At 4003, the IMS authentication procedure begins, i.e., by the S-CSCF of I/S-CSCF 206b or the Registration service 206a i) sending a Multimedia Authorization Request (MAR) to HSS/UDM 13 (which is shown as a combined block that includes Home Subscriber Server (HSS) 131 for the case of message flow using SIP IMS core, or alternatively, Unified Data Management (UDM) function module 132 for the case of message flow using service-based architecture), and ii) receiving a Multimedia Authorization Answer (MAA) from the HSS/UDM 13. At 4004, the S-CSCF of I/S-CSCF 206b or the Registration service 206a sends a "401 Unauthorized" message to the P-CSCF 207, which message is forwarded (at 4005) by the P-CSCF 207 to the SIP client 101. At 4006, the IMS SIP client 101 responds by sending a second SIP REGISTER request to the P-CSCF 207, which second SIP REGISTER request includes the Authorization header containing an authentication challenge response. At 4007, the P-CSCF 207 transforms the SIP REGISTER request to a Register Request REST API and routes the request to the Registration service 206a (in the case the IMS core is implemented using Service-Based Architecture), otherwise the SIP REGISTER request is routed to the I/S-CSCF 206b. At 4008, the I/S-CSCF 206b or the Registration service 206a i) sends a Server Assignment Request (SAR) to HSS/UDM 13, and ii) receives a Server Assignment Answer (SAA) from the HSS/UDM 13. At 4009, the I/S-CSCF 206b or the Registration service 206a sends a "200 OK" message to the P-CSCF 207, at which point successful authentication (which will be treated as successful registration for the purpose of this document) has been achieved in this example embodiment for the next step of obtaining an authorization code.

Upon successful authentication (registration), the P-CSCF 207 sends (at 4010) a request (labelled "HTTPS POST" in FIG. 4) to the HSS/UDM 13, to issue an authorization code. At 4011, the HSS/UDM 13 issues an authorization code (which is an example of a network-issued authorization grant), along with the scope of the service (e.g., RCS), in a "200 OK" message to the P-CSCF 207, which in turn relays (at 4012) the "200 OK" message to the IMS SIP client 101. At 4013, the IMS SIP client 101 triggers a registration notification (hence making available the authorization code) to a trusted RCS application, e.g., RCS application 102. At 4014, the RCS application 102 registers with RCS network's RCS API GW 11, by sending "HTTPS POST" message containing the authorization code and the RCS API GW Uniform Resource Locator (URL), and no user interaction is required. In the case the RCS application 102 is downloaded after native IMS registration, the device integration can enable a trusted app (e.g., the RCS application 102) to obtain the authorization code from the native client, in which case the native client explicitly requests the authorization code from the IMS network, e.g., by sending a refresh REGISTER request. In addition, the RCS API GW URL to use can either be pre-configured by operation in the RCS application, or supplied along with the authorization code to the native client (as shown at 4012 in FIG. 4), and the RCS API GW URL is then made available to the RCS application. The specific embodiments provided herein are merely exemplary, and the present disclosure encompasses other means to provide RCS API GW URL.

At 4015, the RCS API GW 11 sends "HTTPS POST" message containing the authorization code to the HSS/UDM 13. The HSS/UDM 13 verifies the authorization code, generates an access token, and sends (at 4016a) a "200 OK" message containing the access token to the RCS API GW 11. At 4016b, the RCS API GW 11 requests the user (subscriber) profile from HSS/UDM 13 using the access token, i.e., by sending "HTTPS GET" message containing the access token to the HSS/UDM 13. The HSS/UDM 13 sends (at 4016c) a "200 OK" message containing the user (subscriber) profile. The RCS API GW 11 caches the user (subscriber) profile and the access token, generates a session ID, and maps the cached information to the generated session ID towards the RCS application (client). At 4017, the RCS API GW 11 then sends a "HTTPS 200 OK" message containing the session ID and node fully qualified domain name (FQDN), which session ID is used by RCS application 102 for all subsequent interactions. At 4018, a notification channel is created between the RCS application 102 and RCS API GW 11, after which the RCS service is provided for the RCS application 102 by RCS application server (AS) 12.

Figure 5:
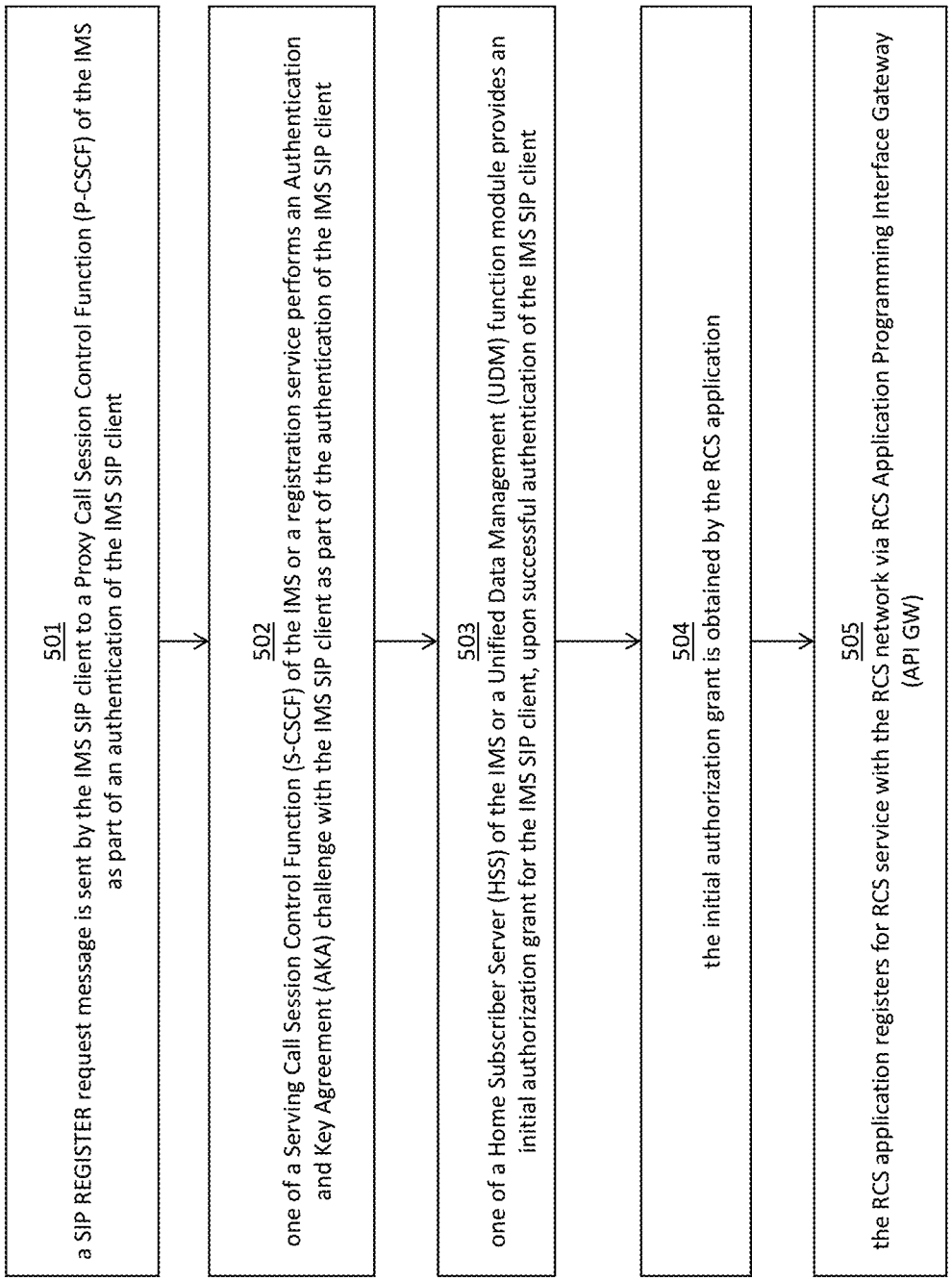
FIG. 5 is a flowchart illustrating a method for authentication of RCS application on a UE for RCS service provided by an RCS network that is separate from an IMS.

FIG. 5 is a flowchart illustrating an example method of providing authentication for Rich Communication Services (RCS) application on a user equipment (UE) for RCS service provided by an RCS network, wherein the RCS network is separate from an IP Multimedia Subsystem (IMS), and wherein IMS Session Initiation Protocol (SIP) client is provided on the UE. At block 501, a SIP REGISTER request message is sent by the IMS SIP client to a Proxy Call Session Control Function (P-CSCF) of the IMS as part of an authentication of the IMS SIP client. At block 5002, one of a Serving Call Session Control Function (S-CSCF) of the IMS or a registration service performs an Authentication and Key Agreement (AKA) challenge with the IMS SIP client as part of the authentication of the IMS SIP client. At block 503, one of a Home Subscriber Server (HSS) of the IMS or a Unified Data Management (UDM) function module provides an initial authorization grant for the IMS SIP client, upon successful authentication of the IMS SIP client. At block 504, the initial authorization grant is obtained by the RCS application. At block 505, the RCS application registers for RCS service with the RCS network via RCS Application Programming Interface Gateway (API GW).

In this document, the term "computer-readable medium" generally refers to media such as removable storage drive, a hard disk installed in hard disk drive, and the like, which media serve as storage for computer programs that can be provided to, and executed by, computer systems. Computer programs can also be received via a communications interface. Computer programs, when executed, enable the computer system to perform the features of the present invention, as discussed herein. In particular, the computer programs, when executed, enable a processor to perform the features of the example embodiments of the present disclosure.

The example embodiments according to the present disclosure can be implemented primarily in software or, in the alternative, in hardware using, for example, hardware components such as application specific integrated circuits (ASICs). Implementation of the hardware state machine so as to perform the functions described herein will be apparent to persons skilled in the relevant art(s). Alternatively, the example embodiments according to the present disclosure can be implemented using a combination of both hardware and software.

While various example embodiments of the present disclosure have been described above, the example embodiments are merely exemplary and should not be interpreted as limiting. It will be apparent to persons skilled in the relevant art(s) that various changes in form and detail can be made therein, and these variations are fully encompassed by the present disclosure.

The invention claimed is:

1. A method of providing authentication for Rich Communication Services (RCS) application on a user equipment (UE) for RCS service provided by an RCS network, wherein the RCS network is separate from an IP Multimedia Subsystem (IMS), and wherein IMS Session Initiation Protocol (SIP) client is provided on the UE, the method comprising:
   performing an authentication of the IMS SIP client, wherein the authentication comprises:
      sending, by the IMS SIP client, a SIP REGISTER request message to a Proxy Call Session Control Function (P-CSCF) of the IMS; and
      performing, by one of a Serving Call Session Control Function (S-CSCF) of the IMS or a registration service, an Authentication and Key Agreement (AKA) challenge with the IMS SIP client;

providing, by one of a Home Subscriber Server (HSS) of the IMS or a Unified Data Management (UDM) function module, an initial authorization grant for the IMS SIP client, upon successful authentication of the IMS SIP client;

obtaining, by the RCS application, the initial authorization grant; and registering, by the RCS application, via RCS Application Programming Interface Gateway (API GW) of the RCS network, for RCS service with the RCS network;

wherein the initial authorization grant comprises one of an access token or an authorization code, and wherein the initial authorization grant is provided by one of the HSS or the UDM function module to one of the S-CSCF or the registration service, and wherein one of the S-CSCF or the registration service provides the initial authorization grant to the IMS SIP client; and upon receipt of the initial authorization grant by the IMS SIP client, i) the initial authorization grant is transmitted by the IMS SIP client to the RCS application; or ii) the initial authorization grant is transmitted by the IMS SIP client to the RCS application in response to a query from the RCS application.

2. The method of claim 1, wherein the registering via the RCS API GW comprises:

sending, by the RCS application, a message containing the initial authorization grant to the RCS API GW.

3. The method of claim 1, wherein the initial authorization grant is an authorization code, and wherein the registering via the RCS API GW comprises:

sending, by the RCS application, a message containing the initial authorization grant to the RCS API GW; and obtaining, by the RCS API GW, an access token from one of the HSS or the UDM function module.

4. A method of providing authentication for Rich Communication Services (RCS) application on a user equipment (UE) for RCS service provided by an RCS network, wherein the RCS network is separate from an IP Multimedia Subsystem (IMS), and wherein IMS Session Initiation Protocol (SIP) client is provided on the UE, the method comprising:

performing an authentication of the IMS SIP client, wherein the authentication comprises:

sending, by the IMS SIP client, a SIP REGISTER request message to a Proxy Call Session Control Function (P-CSCF) of the IMS; and performing, by one of a Serving Call Session Control Function (S-CSCF) of the IMS or a registration service, an Authentication and Key Agreement (AKA) challenge with the IMS SIP client;

providing, by one of a Home Subscriber Server (HSS) of the IMS or a Unified Data Management (UDM) function module, an initial authorization grant for the IMS SIP client, upon successful authentication of the IMS SIP client;

obtaining, by the RCS application, the initial authorization grant; and registering, by the RCS application, via RCS Application Programming Interface Gateway (API GW) of the RCS network, for RCS service with the RCS network;

wherein the initial authorization grant comprises one of an access token or an authorization code, and wherein the initial authorization grant is provided by one of the HSS or the UDM function module to one of the P-CSCF and wherein the P-CSCF provides the initial authorization grant to the IMS SIP client;

upon receipt of the initial authorization grant by the IMS SIP client, i) the initial authorization grant is transmitted by the IMS SIP client to the RCS application; or ii) the initial authorization grant is transmitted by the IMS SIP client to the RCS application in response to a query from the RCS application.

5. The method of claim 4, wherein the registering via the RCS API GW comprises:

sending, by the RCS application, a message containing the initial authorization grant to the RCS API GW.

6. The method of claim 4, wherein the initial authorization grant is an authorization code, and wherein the registering via the RCS API GW comprises:

sending, by the RCS application, a message containing the initial authorization grant to the RCS API GW; and obtaining, by the RCS API GW, an access token from one of the HSS or the UDM function module.

7. A system for providing authentication for Rich Communication Services (RCS) application on a user equipment (UE) for RCS service provided by an RCS network, wherein the RCS network is separate from an IP Multimedia Subsystem (IMS), and wherein IMS Session Initiation Protocol (SIP) client is provided on the UE, the system comprising:

a hardware processor executing instructions stored on a memory to implement a Proxy Call Session Control Function (P-CSCF) of the IMS configured to receive a SIP REGISTER request message sent from an IMS SIP client as part of an authentication of the IMS SIP client;

a hardware processor executing instructions stored on a memory to implement one of a Serving Call Session Control Function (S-CSCF) of the IMS or a registration service configured to perform an Authentication and Key Agreement (AKA) challenge with the IMS SIP client as part of the authentication of the IMS SIP client; and a hardware processor executing instructions stored on a memory to implement one of a Home Subscriber Server (HSS) of the IMS or a Unified Data Management (UDM) function module configured to provide an initial authorization grant for the IMS SIP client, upon successful authentication of the IMS SIP client;

wherein the RCS application, after obtaining the initial authorization grant, registers for RCS service with the RCS network, via RCS Application Programming Interface Gateway (API GW) of the RCS network;

wherein the initial authorization grant comprises one of an access token or an authorization code, and wherein the initial authorization grant is provided by one of the HSS or the UDM function module to one of the S-CSCF or the registration service, and wherein one of the S-CSCF or the registration service provides the initial authorization grant to the IMS SIP client; and upon receipt of the initial authorization grant by the IMS SIP client, i) transmit, by the IMS SIP client, the initial authorization grant to the RCS application; or ii) transmit, by the IMS SIP client, the initial authorization grant to the RCS application in response to a query from the RCS application.

8. The system of claim 7, wherein the registering via the RCS API GW comprises:

sending, by the RCS application, a message containing the initial authorization grant to the RCS API GW.

9. The system of claim 7, wherein the initial authorization grant is an authorization code, and wherein the registering via the RCS API GW comprises:

sending, by the RCS application, a message containing the initial authorization grant to the RCS API GW; and obtaining, by the RCS API GW, an access token from one of the HSS or the UDM function module.

10. A system for providing authentication for Rich Communication Services (RCS) application on a user equipment (UE) for RCS service provided by an RCS network, wherein the RCS network is separate from an IP Multimedia Subsystem (IMS), and wherein IMS Session Initiation Protocol (SIP) client is provided on the UE, the system comprising:

a hardware processor executing instructions stored on a memory to implement a Proxy Call Session Control Function (P-CSCF) of the IMS configured to receive a SIP REGISTER request message sent from an IMS SIP client as part of an authentication of the IMS SIP client;

a hardware processor executing instructions stored on a memory to implement one of a Serving Call Session Control Function (S-CSCF) of the IMS or a registration service configured to perform an Authentication and Key Agreement (AKA) challenge with the IMS SIP client as part of the authentication of the IMS SIP client; and a hardware processor executing instructions stored on a memory to implement one of a Home Subscriber Server (HSS) of the IMS or a Unified Data Management (UDM) function module configured to provide an initial authorization grant for the IMS SIP client, upon successful authentication of the IMS SIP client;

wherein the RCS application, after obtaining the initial authorization grant, registers for RCS service with the RCS network, via RCS Application Programming Interface Gateway (API GW) of the RCS network;

wherein the initial authorization grant comprises one of an access token or an authorization code, and wherein the initial authorization grant is provided by one of the HSS or the UDM function module to the P-CSCF, and wherein the P-CSCF provides the initial authorization grant to the IMS SIP client; and upon receipt of the initial authorization grant by the IMS SIP client,
  i) transmit, by the IMS SIP client, the initial authorization grant to the RCS application; or
  ii) transmit, by the IMS SIP client, the initial authorization grant to the RCS application in response to a query from the RCS application.

11. The system of claim 10, wherein the registering via the RCS API GW comprises:

sending, by the RCS application, a message containing the initial authorization grant to the RCS API GW.

12. The system of claim 10, wherein the initial authorization grant is an authorization code, and wherein the registering via the RCS API GW comprises:

sending, by the RCS application, a message containing the initial authorization grant to the RCS API GW; and obtaining, by the RCS API GW, an access token from one of the HSS or the UDM function module.

* * * * *